United States Patent
Brady et al.

(10) Patent No.: US 7,882,232 B2
(45) Date of Patent: Feb. 1, 2011

(54) RAPID RESOURCE PROVISIONING WITH AUTOMATED THROTTLING

(75) Inventors: John F. Brady, Brooklyn, NY (US); Peter Cipriano, Staatsburg, NY (US); Michael J. Harkins, Freehold, NJ (US); Dan R. Herold, Toronto (CA); Magnus Larsson, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 12/240,193

(22) Filed: Sep. 29, 2008

(65) Prior Publication Data
US 2010/0082812 A1 Apr. 1, 2010

(51) Int. Cl.
*G06F 15/173* (2006.01)

(52) U.S. Cl. ............... 709/226; 709/221; 709/232; 709/235

(58) Field of Classification Search ........... 709/221, 709/226, 235, 232
See application file for complete search history.

(56) References Cited

U.S. PATENT DOCUMENTS

| | | | |
|---|---|---|---|
| 6,052,761 A | 4/2000 | Hornung et al. | |
| 6,516,350 B1 * | 2/2003 | Lumelsky et al. | 709/226 |
| 6,553,420 B1 * | 4/2003 | Karger et al. | 709/226 |
| 7,093,004 B2 * | 8/2006 | Bernardin et al. | 709/219 |
| 7,127,513 B2 * | 10/2006 | Karger et al. | 709/226 |
| 7,213,065 B2 | 5/2007 | Watt | |
| 7,213,087 B1 * | 5/2007 | Bertone et al. | 710/56 |
| 7,249,354 B2 | 7/2007 | Tigani et al. | |
| 7,308,448 B1 | 12/2007 | Martin | |
| 7,363,374 B2 | 4/2008 | Paul et al. | |
| 7,363,479 B1 | 4/2008 | Walker et al. | |
| 7,406,691 B2 * | 7/2008 | Fellenstein et al. | 718/104 |
| 7,437,460 B2 * | 10/2008 | Chidambaran et al. | 709/226 |
| 7,516,221 B2 * | 4/2009 | Souder et al. | 709/226 |
| 7,680,933 B2 * | 3/2010 | Fatula, Jr. | 709/226 |
| 7,698,430 B2 * | 4/2010 | Jackson | 709/226 |
| 2003/0131078 A1 | 7/2003 | Scheer et al. | |
| 2003/0177240 A1 * | 9/2003 | Gulko et al. | 709/226 |
| 2005/0125537 A1 * | 6/2005 | Martins et al. | 709/226 |

(Continued)

FOREIGN PATENT DOCUMENTS

JP 2008035522 A 2/2008

OTHER PUBLICATIONS

Bannon, David et al.; "Experiences with a Grid Gateway Architecture Using Virtual Machines," Second International Workshop on Virtualization Technology in Distributed Computing (VTDC 2006), pp. 1-8.

(Continued)

*Primary Examiner*—Michael Won
(74) *Attorney, Agent, or Firm*—Arthur J. Samodovitz, Esq.; Geraldine D. Monteleone, Esq.; Heslin Rothenberg Farley & Mesiti P.C.

(57) ABSTRACT

Resources are rapidly provisioned using a repeatable, error free deployment technique. The technique includes an automatic throttle of a build management node to conform to existing network limitations in order to maximize the number of build operations which can be performed concurrently, while queuing up remaining requests to be executed, in response to sufficient network bandwidth becoming available.

19 Claims, 11 Drawing Sheets

U.S. PATENT DOCUMENTS

| | | | |
|---|---|---|---|
| 2006/0031509 A1* | 2/2006 | Ballette et al. | 709/226 |
| 2006/0129585 A1 | 6/2006 | Ishiki et al. | |
| 2006/0136490 A1 | 6/2006 | Aggarwal et al. | |
| 2006/0190602 A1* | 8/2006 | Canali et al. | 709/226 |
| 2006/0190775 A1 | 8/2006 | Aggarwal et al. | |
| 2006/0224741 A1* | 10/2006 | Jackson | 709/226 |
| 2006/0230149 A1* | 10/2006 | Jackson | 709/226 |
| 2007/0174657 A1 | 7/2007 | Ahmadian et al. | |
| 2007/0283016 A1* | 12/2007 | Pendarakis et al. | 709/226 |
| 2008/0028075 A1* | 1/2008 | Dini et al. | 709/226 |
| 2008/0065704 A1* | 3/2008 | MacCormick et al. | 707/204 |
| 2008/0104217 A1 | 5/2008 | Srinivasa et al. | |
| 2008/0120403 A1 | 5/2008 | Lowery et al. | |
| 2010/0082812 A1* | 4/2010 | Brady et al. | 709/226 |

OTHER PUBLICATIONS

Zhang, Zhe et al.; "Optimizing Center Performance through Coordinated Data Staging, Scheduling and Recovery," Association for Computing Machinery, SC07 Nov. 10-16, 2007.

Liu, Li et al.; "Optimization of Frequent Itemset Mining on Multiple-Core Processor," VLDB '07, Sep. 23-28, 2007.

IBM Publication SG24-6623-00; "Building a Linux HPC Cluster with XCat," Ford et al., Sep. 25, 2002.

Lee et al., "A Stochastic Availability Prediction Model for Head Nodes in the HA Cluster," 22nd Internation Conference on Advanced Information Networking and Applications, pp. 157-161, Mar. 2008.

Coles et al., "Rapid Node Reallocation Between Virtual Clusters of Data Intensive Utility Computing," 1-4244-038, Jun. 2006.

* cited by examiner

RAPID RESOURCE PROVISIONING WITH AUTOMATED THROTTLING

TECHNICAL FIELD

This invention relates, in general, to high performance computing or grid environments, and in particular, to facilitating efficient and rapid provisioning of resources in such an environment.

BACKGROUND OF THE INVENTION

A high performing grid environment includes a large number of resources (e.g., nodes) that are available for use by a plurality of customers. A customer makes a request for a particular number of resources that are to be available at a specific day and time for the customer's use. When the request is received, it is expected that the requested resources will be provided to the customer at the requested time for a specified duration.

Currently, there are provisioning techniques available. However, the current processes used to provide the resources are inefficient, error prone and/or unpredictable.

SUMMARY OF THE INVENTION

Based on the foregoing, a need exists for a capability that enables rapid, repeatable, error free deployment of resources upon request. A need exists for a provisioning technique that has a throttling capability to control and maximize the speed at which the resources are provisioned (also referred to herein as deployed).

The shortcomings of the prior art are overcome and additional advantages are provided through the provision of a method of managing the building of resources to be provisioned. The method includes, for instance, obtaining a request for a number of resources that are to be built for provisioning, wherein the number of resources requested exceeds bandwidth capability of a network employed in simultaneously building resources; and initiating by a management builder a plurality of child builders to build at least a portion of the number of resources requested, wherein the initiating includes an automatic control to: initiate a number of child builders, wherein the number initiated is such that the concurrent building of resources of the number of child builders will not exceed the bandwidth capability of the network; determine that another child builder is needed in addition to the number of child builders initiated; and initiate the another child builder, in response to recognized capacity on the bandwidth of the network.

Systems and program products relating to one or more aspects of the present invention are also described and claimed herein. Further, services relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

In accordance with an aspect of the present invention, a capability is provided for rapid resource provisioning with automated throttling. This capability enables rapid, repeatable, error free resource deployment in a large scale infrastructure. Resources are provided across a large scale infrastructure using the optimal capacity of a given network bandwidth to support multiple simultaneous resource builds. Resource build requests are throttled to conform to existing network limitations in order to maximize the number of build operations which can be performed concurrently, while queuing up remaining requests to be executed as soon as sufficient network bandwidth becomes available.

As one example, this provisioning capability is used in a large scale infrastructure, such as a grid environment, to provide requested nodes to customers. Although the provisioning of nodes is described herein, one or more aspects of the present invention are applicable to resources other than nodes.

Figure 1:
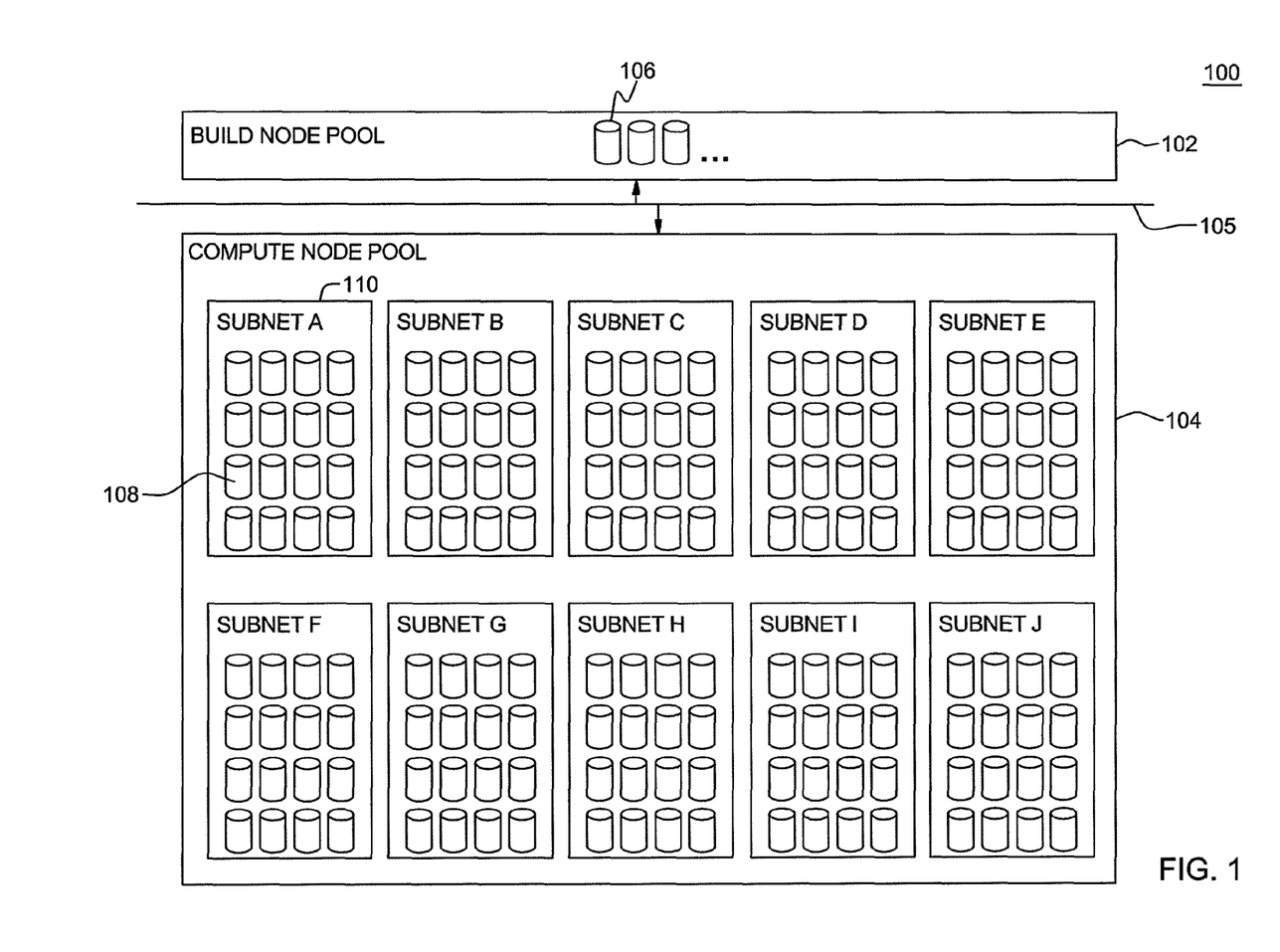
FIG. 1 depicts one embodiment of a grid computing environment to incorporate and use one or more aspects of the present invention.

One example of a grid environment is depicted in FIG. 1. As shown, in one example, a grid environment 100 includes two pools of nodes, including a build node pool 102 and a compute node pool 104 coupled via a network 105 (e.g., TCP/IP). Build node pool 102 includes one or more nodes 106 used to manage the provisioning of nodes at a customer's request. Further, compute node pool 104 includes a plurality of nodes 108 to be provisioned.

In this particular example, the plurality of nodes in the compute node pool are logically separated into subnets 110. Each subnet provides virtual isolation from other subnets. Although in this example subnets are shown, in other examples, this is not necessary. The nodes may be coupled to one another or may be separate nodes. In one particular example, each node is an xSeries® server offered by International Business Machines Corporation. Again, however, this is only one example. Many other types of nodes are possible, including, but not limited to, other types of servers, appliances, etc. xSeries® is a registered trademark of International Business Machines Corporation Armonk, N.Y., U.S.A. Other names used herein may be registered trademarks, trademarks or product names of International Business Machines Corporation or other companies.

The nodes of this grid environment are available to a plurality of customers upon request. For example, a customer may decide that it needs a thousand nodes on a particular day at a particular time. In such a case, the customer requests the nodes and, in accordance with an aspect of the present invention, the nodes are provided to the customer, assuming availability. This is described in further detail herein.

Figure 2:
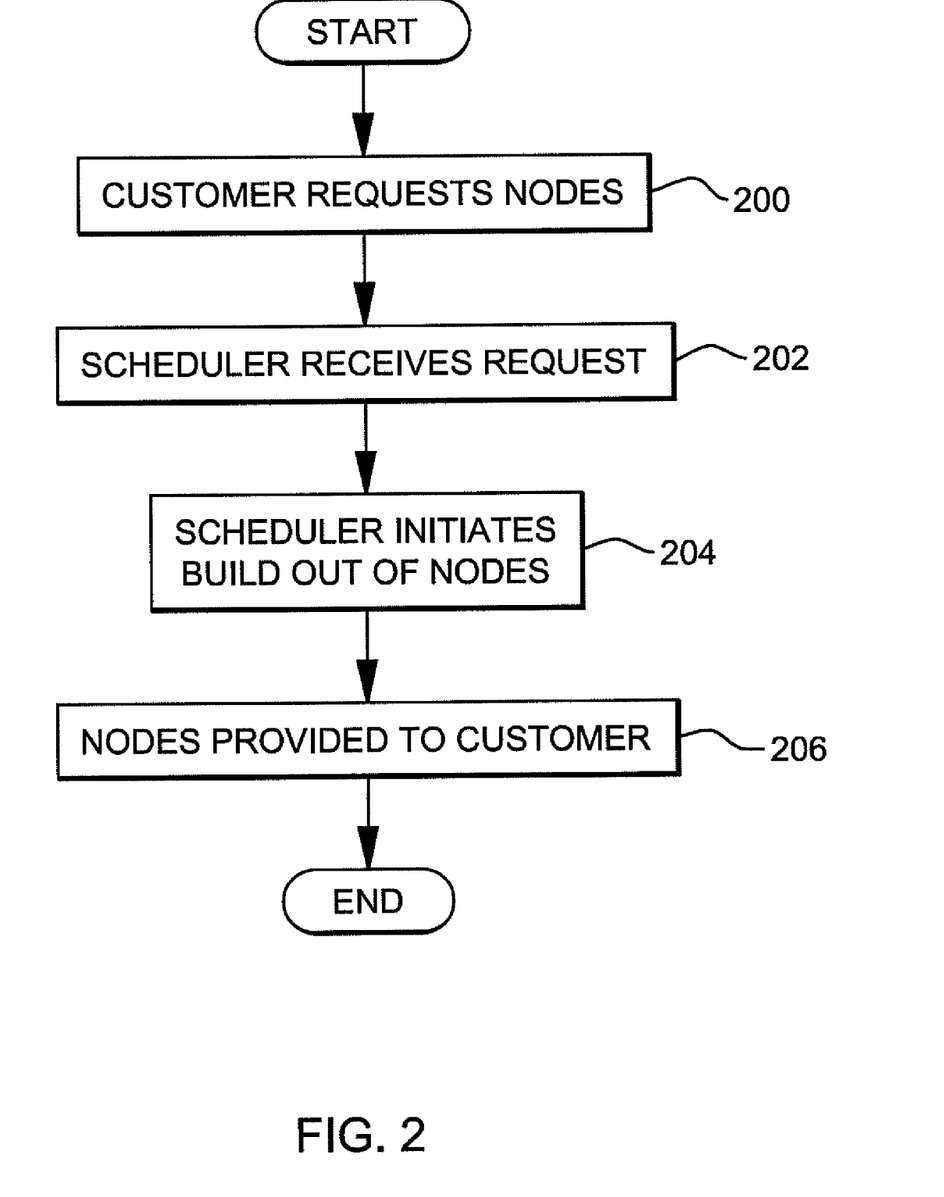
FIG. 2 depicts one embodiment of an overview of a provisioning process, in accordance with an aspect of the present invention.

Referring to FIG. 2, an overview of one example of a node provisioning process is described. Initially, a customer requests a number of nodes, STEP 200. Typically, each request includes a request for a large number of nodes, including, for instance, a hundred, hundreds or even a thousand or more nodes. However, a request can specify any number of nodes up to the maximum available. A master scheduler (also referred to herein as the build management node or management builder) receives the request, STEP 202. In response to the request, the scheduler initiates a build of the requested nodes, including building temporary build nodes (a.k.a., child head nodes) to facilitate the build of the requested nodes, STEP 204. In one example, the build of the nodes is automatically controlled, such that the building does not exceed the available bandwidth of the network but maximizes the build, as described below. When the nodes are built, the nodes are provided to the customer requesting those nodes, STEP 206.

Figure 3:
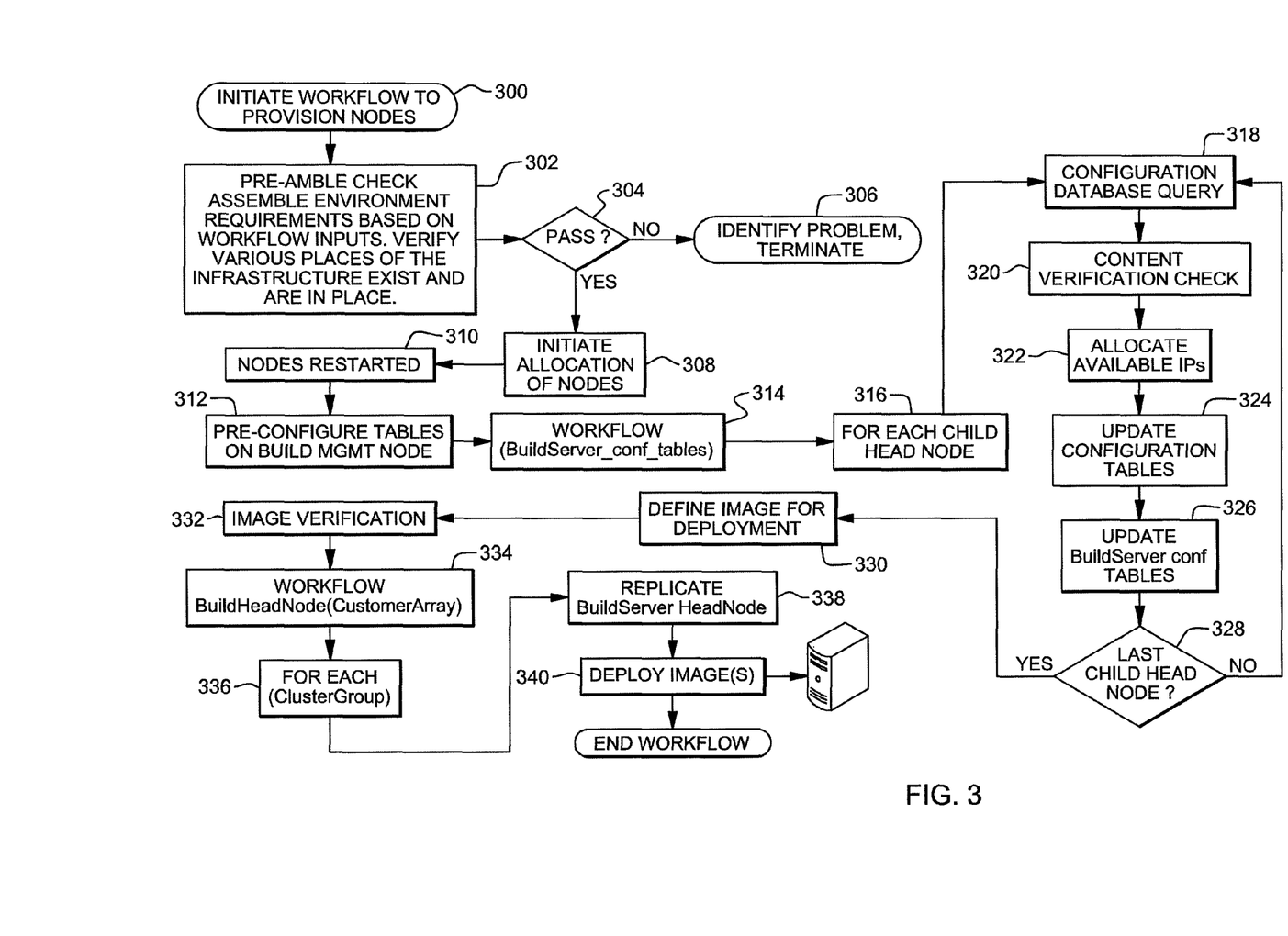
FIG. 3 depicts further details regarding one embodiment of a provisioning process used in accordance with an aspect of the present invention.

Further details regarding one embodiment of a provisioning process are described with reference to FIG. 3. Initially, a workflow is initiated to provision the requested nodes, STEP 300. In one example, this includes receiving by the master scheduler or build management node the request, which includes one or more parameters. The parameters provided depend on implementation, but, in one example, include an identification of the customer requesting the provisioning; a list of one or more applications, including the operating system, as one example, to be placed on the provisioned nodes; an identification of requested resources (e.g., Node A, Node C, etc.); resource type specifying the type of specified resources (e.g., xServer®, etc.); and in one example, an indication of a subnet in which the requested resources are to be placed.

Thereafter, a preamble check is performed, STEP 302. For example, the environment requirements, based on the workflow inputs, are assembled and verification is performed to confirm that various pieces of the infrastructure exist or are in place. This includes, for instance, determining whether any of the requested nodes are already allocated to another customer, whether there are available IP addresses, the nodes are powered on, any necessary management interfaces are available, etc. Should this check fail, INQUIRY 304, then the problem is identified and processing terminates, STEP 306. At this point, one or more manual or automatic steps may be performed in order to resolve the issues.

However, if the check is successful, then allocation of the requested nodes is initiated, STEP 308. As part of the allocation, the requested nodes (that have passed the preamble check at STEP 302) are placed in an allocation array. Then, each node defined for allocation into this new customer board is restarted to bootstrap the nodes, STEP 310. By restarting the nodes, the nodes search for a network installation point.

Additionally, tables on the build management node are pre-configured, STEP 312. Specifically, based on the input provided to the workflow, the configuration database is queried for a list of parameter values with which to pre-populate the configuration files for the build management node, referred to herein as build server configuration files. For instance, based on the input and previous processing, the configuration database is queried for the MAC addresses of all the nodes to be provisioned, and these addresses are placed in the configuration files, STEP 314. In a further example, the operating system images for all of the nodes to be provisioned are also included in the configuration files.

Processing then continues with configuring one or more child head nodes (a.k.a., child builders), STEP 316. For instance, a child head node is selected, and the configuration database is queried for attributes of that node, including, for instance, the MAC addresses and relevant information pertinent to the nodes to be built by this head node, STEP 318. Then, a content verification check is performed to ensure the retrieved attributes are valid are the fields populated—this validates the physical infrastructure of the node, STEP 320.

Moreover, an available IP address is allocated for each of the nodes to be built by the child head node, STEP 322. Further, the configuration tables of this node are updated to include the configuration (e.g., assign an available IP address to a MAC address and insert in the table), STEP 324. Additionally, the build server configuration tables are updated with the information in the updated configuration tables of the child head node and with completion status of the child head node, STEP 326. Thereafter, if this is not the last child head node, INQUIRY 328, then processing continues at STEP 318. Otherwise, processing continues with STEP 330.

At STEP 330, an image to be used for deployment is defined. This image includes, for instance, an image stack including a base operating system image, in addition to supporting agent software. As a specific example, a Linux image stack may include the base RedHat Linux OS, and include agent installs for monitoring, management and secure communications post-install. The build management node is configured with the appropriate image base for deployment. The image is then verified, STEP 332. This is a final verification process to ensure the selected applications of the image configured for deployment exist on the build management node.

Next, a workflow is initiated to build one or more child head nodes using the configuration files defined above. Each child head node is responsible for building a group of one or more compute nodes (a.k.a., cluster group), STEP 334. In this example, each group can include up to 32 nodes, including the child head node. For maximum performance, each group includes the maximum number of nodes unless the requested number of nodes has been met. For instance, if the request is for 730 nodes, then there will be 22 groups of the maximum of 32 nodes and 1 group of 26 nodes built, as one example. However, due to limitations on network bandwidth, only a certain number of builds can be concurrently processed. Therefore, the number of child head nodes initiated to concurrently process builds is controlled not to exceed the network limitations, as described below.

For each cluster group to be initially processed, STEP 336, a child head node is created and the compute nodes are built, STEP 338. The child head node is specifically built as a paired down build server whose purpose is to configure each node within its respective subnet. In one example, the maximum number of head nodes are created concurrently. The child head node is built as a local build server, and the building of a head node includes, for instance, loading a provisioning tool on the head node, which will be used to create its compute nodes. One example of a provisioning tool is xCAT (Extreme Cluster Administration Toolkit), which is an open source tool available at http://xcat.sourceforge.net/. One embodiment of xCAT is described in "Building a Linux HPC Cluster with xCAT," Ford et al., SG24-6623-00, Sep. 25, 2002, which is hereby incorporated herein by reference in its entirety. Further, the building includes loading the configuration files described above, which indicate the compute nodes to be built; and loading the appropriate operating system image, which is deployed on the compute nodes when built. (In other embodiments, other applications, etc. may be loaded.)

Subsequent to building the head node, the head node builds its compute nodes, which includes deploying the operating system (and optionally, other applications) on the compute nodes, STEP 340. The compute nodes are available for productive use, rather than for management use to build nodes.

In accordance with an aspect of the present invention, the child build nodes build their nodes concurrently with respect to one another. Further, the management build node builds the maximum number of child build nodes that can be concurrently building nodes, as supported by the capacity of the network bandwidth. This is described in further detail with respect to FIGS. 4A-4C and FIGS. 5-6.

Figure 4A:
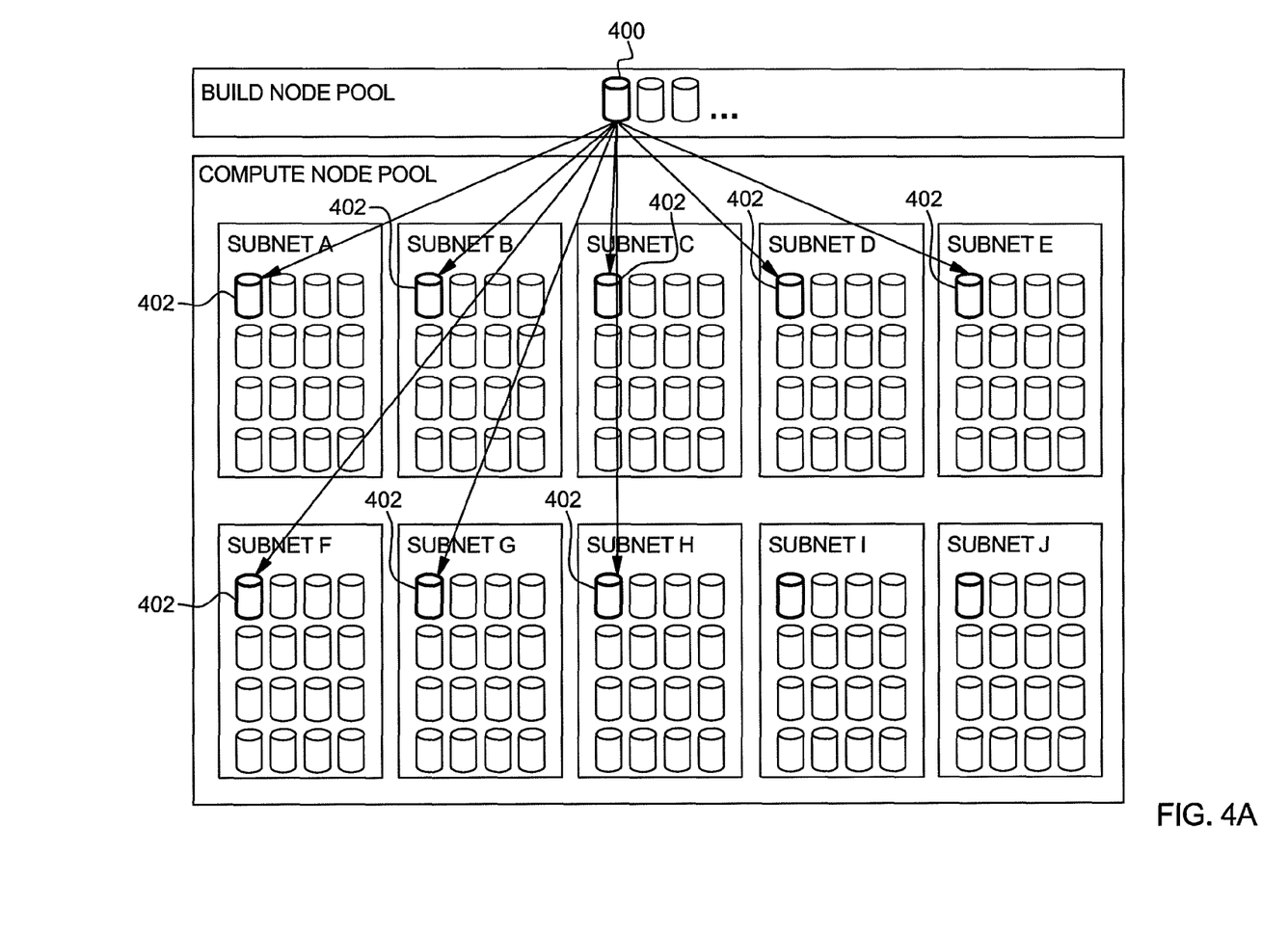
FIGS. 4a-4c pictorially depict the building of resources to be provisioned, in accordance with an aspect of the present invention.

Referring to FIG. 4A, a build management node 400 is used to build a plurality of child build nodes 402 (outlined in bold in the compute node pool). The number of child build nodes built is selected based on maximizing the number of build operations which can be performed concurrently with respect to network limitations. For instance, when building nodes remotely across Layer 2 and Layer 3 of a TCP/IP gigabit network, a concurrent build bottleneck of 28-32 nodes exists (due to communications across the network during the build process) at which point build requests will begin to time out and fail. By fanning out the build process across subnets, this limitation is addressed. In one example, an adjustable variable is used that includes the maximum number of child build nodes that can be built at the same time as to not flood the network. This value can be retrieved from a data store or be determined. The value will be decremented and incremented according to the completion status of the child build nodes.

Figure 4B:
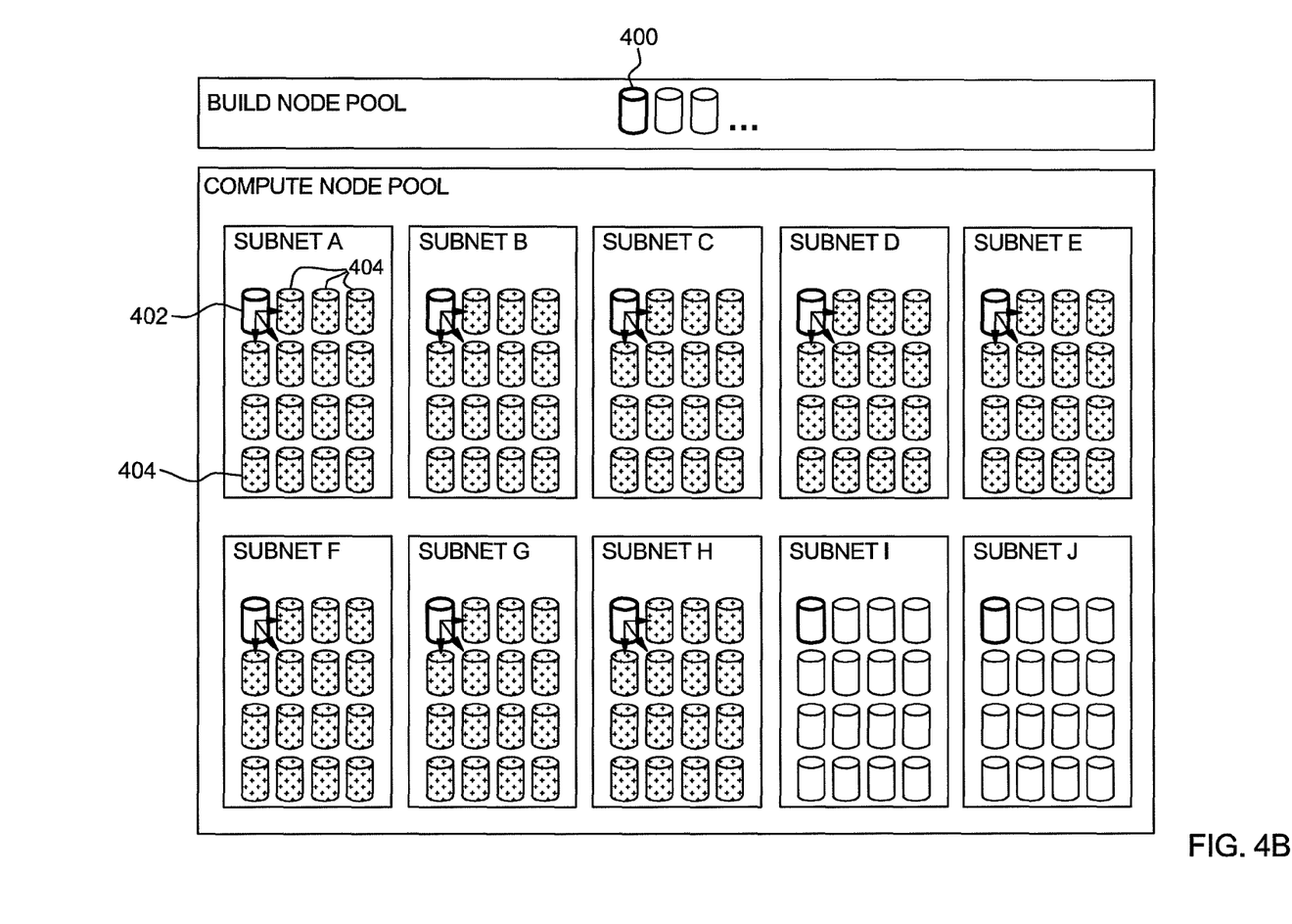
Figure 4C:
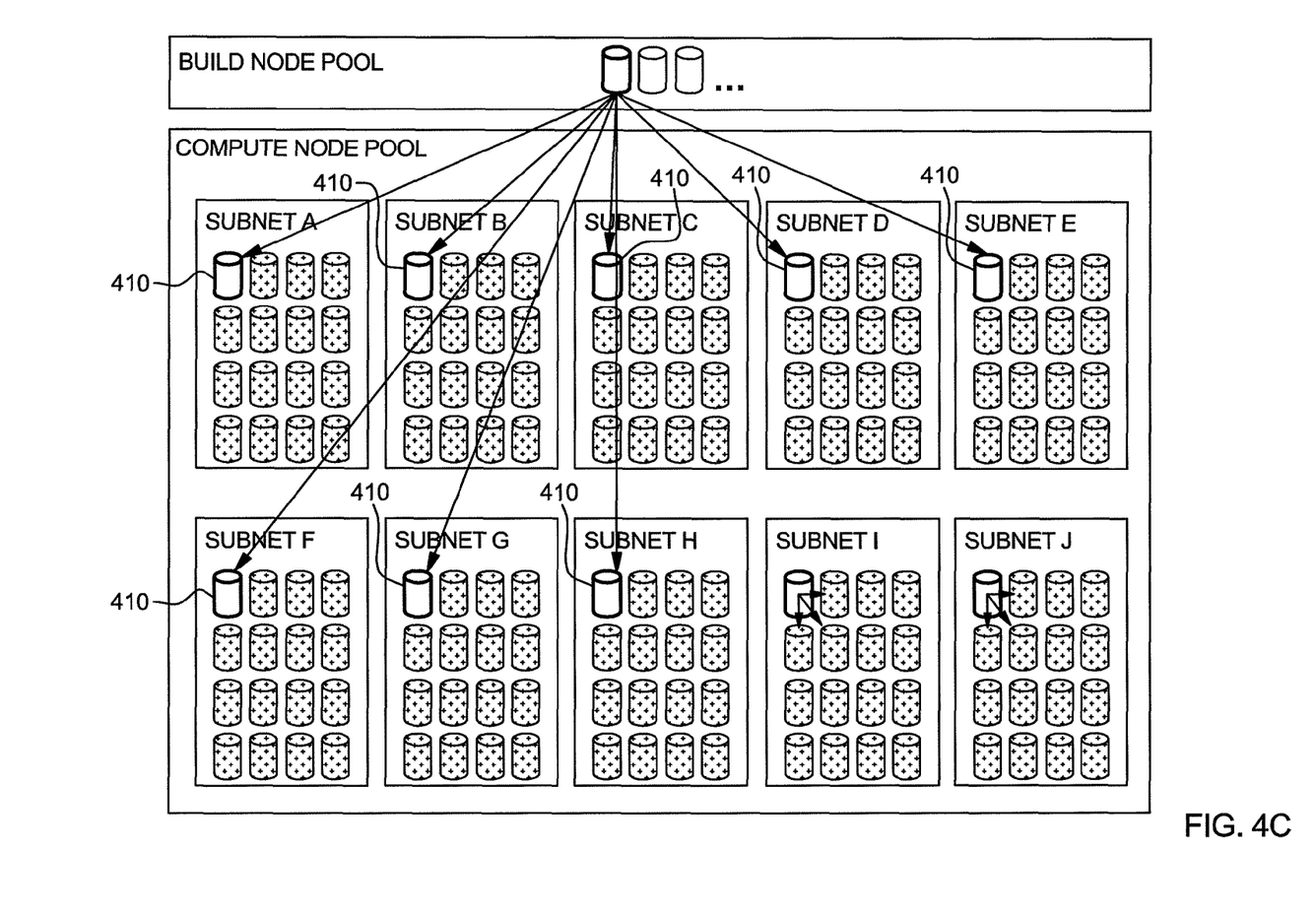

Referring to FIG. 4B, each of the child build nodes 402 builds a plurality of compute nodes 404 (those nodes in the compute node pool indicated with shading). When a child build node completes building its nodes, it signals completion to the build management node, which then transforms the child build node to a functioning compute node 410, as shown in FIG. 4C and further described with reference to FIG. 5. This enables other child build nodes to be built and used for building other compute nodes (see, e.g., Subnet I and Subnet J of FIG. 4C).

Figure 5:
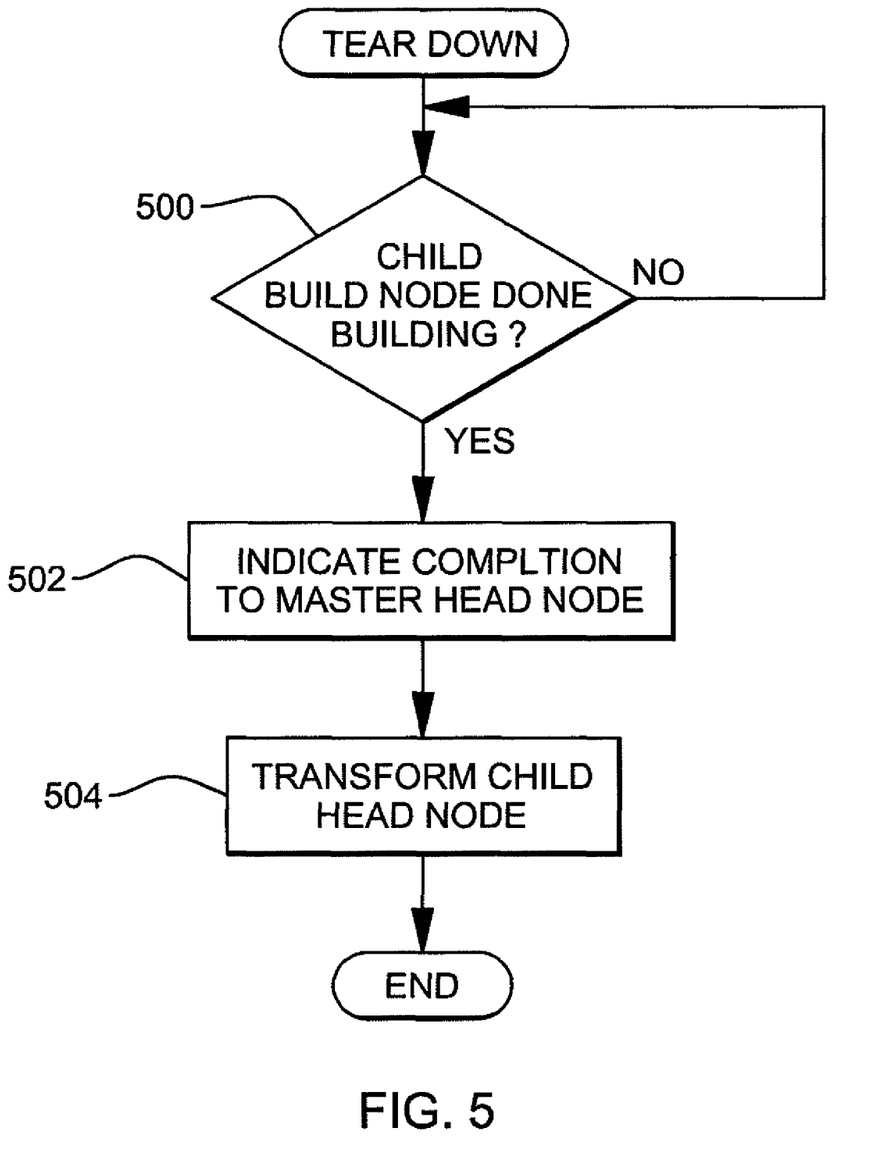
FIG. 5 depicts one embodiment of the logic to tear down a build resource to provide a functioning compute resource, in accordance with an aspect of the present invention.

With reference to FIG. 5, in accordance with an aspect of the present invention, when a child build node has completed building the number of nodes that it is to build, INQUIRY 500, then a completion indication is provided to the build management node, STEP 502. In one example, the build management node polls each child head node to determine when it has competed its building. For example, the build management node tracks every workflow transition within the deployment process from the initial request to completion of each sub-task including the overall request. The indication is provided by tracking the success or failure of each individual step. When the child head node is finished, the build management node transforms the child build node to a functioning compute node. In particular, the build management node clears (e.g., reboots) the child build node, and then rebuilds the node with the customer's image (e.g., loads the operating system and/or other applications for the customer).

When the child build node has completed building its nodes, then network bandwidth is available for other child build nodes to build nodes. This processing is described with reference to FIG. 6.

Figure 6:
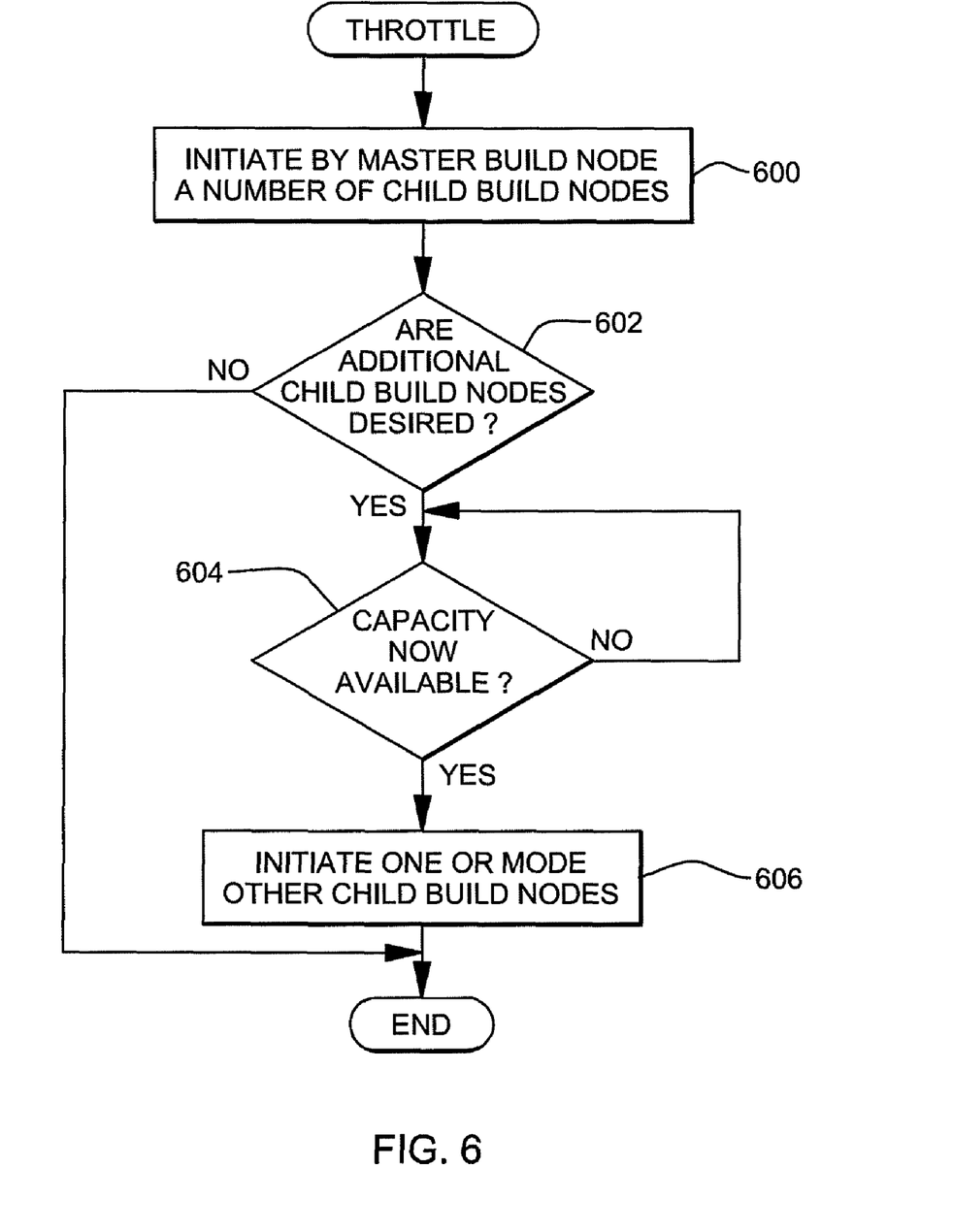
FIG. 6 depicts one embodiment of the logic used to manage the provisioning process in order to maximize use of the available network bandwidth, in accordance with an aspect of the present invention.

As described above, initially, a build management node initiates a number of child build nodes to perform the building process, STEP 600. The number of child build nodes initiated depends on the bandwidth of the network. If, for instance, the number of nodes requested requires 35 child nodes to each build 31 nodes, but the network bandwidth can only support 32 child build nodes simultaneously building, then 32 is the number of child build nodes initiated by the build management node. If additional child build nodes are desired, INQUIRY 602, as in the example provided herein, then a determination is made as to whether the network bandwidth has available capacity, INQUIRY 604. If it does not, since the other child build nodes are not complete, then it waits. However, when a child build node has completed building its nodes and now there is further capacity on the network, the build management node initiates one or more other child build nodes, STEP 606, depending on capacity of the bandwidth.

This throttling process enables the build management node to maximize use of the network bandwidth, while not exceeding the network bandwidth's capability to support multiple simultaneous server builds. This is simultaneous based on concurrency metrics within the workflow engine.

Described in detail above is a capability to provide a rapid, repeatable and error free resource deployment process. A technique is provided for a build management node to replicate multiple child build node instances to facilitate rapid scale out of a computing environment and enable hundreds of target nodes to be built concurrently to meet the needs of a single deployment request. This capability includes a control to automatically throttle the build management node to not exceed the capability of the network bandwidth to support multiple simultaneous builds. Resource build requests are throttled to conform to existing network limitations in order to maximize the number of build operations which can be performed concurrently, while queuing up remaining requests to be executed as soon as efficient network bandwidth becomes available.

In yet a further aspect of the present invention, a technique is provided for deploying one or more aspects of the provisioning logic on one or more processing units. One embodiment of the deployment logic is described with reference to FIGS. 7A-7B.

Figure 7A:
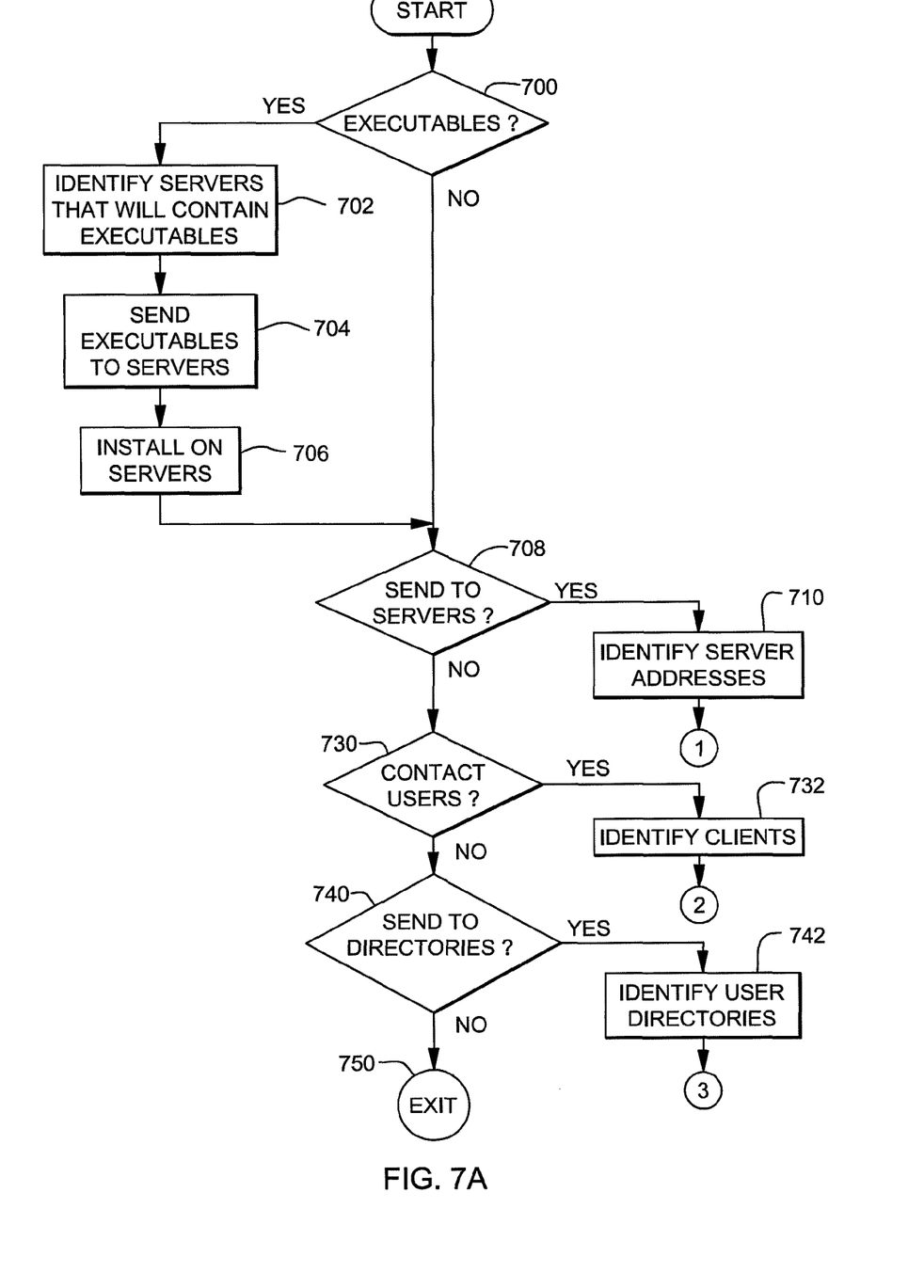
FIGS. 7A-7B depict one embodiment of the logic to deploy provisioning logic on one or more processing units, in accordance with an aspect of the present invention.

Referring to FIG. 7A, initially, a determination is made as to whether there are any programs that are to reside on one or more servers when the provisioning logic is executed, INQUIRY 700. If so, then the one or more servers to include the executables are identified, STEP 702, and the provisioning logic for the one or more servers is transferred directly to the servers' storage via, for instance, a File Transfer Protocol (FTP) or some other protocol or by copying through the use of a shared file system, STEP 704. The logic is then installed on the servers, STEP 706.

Figure 7B:
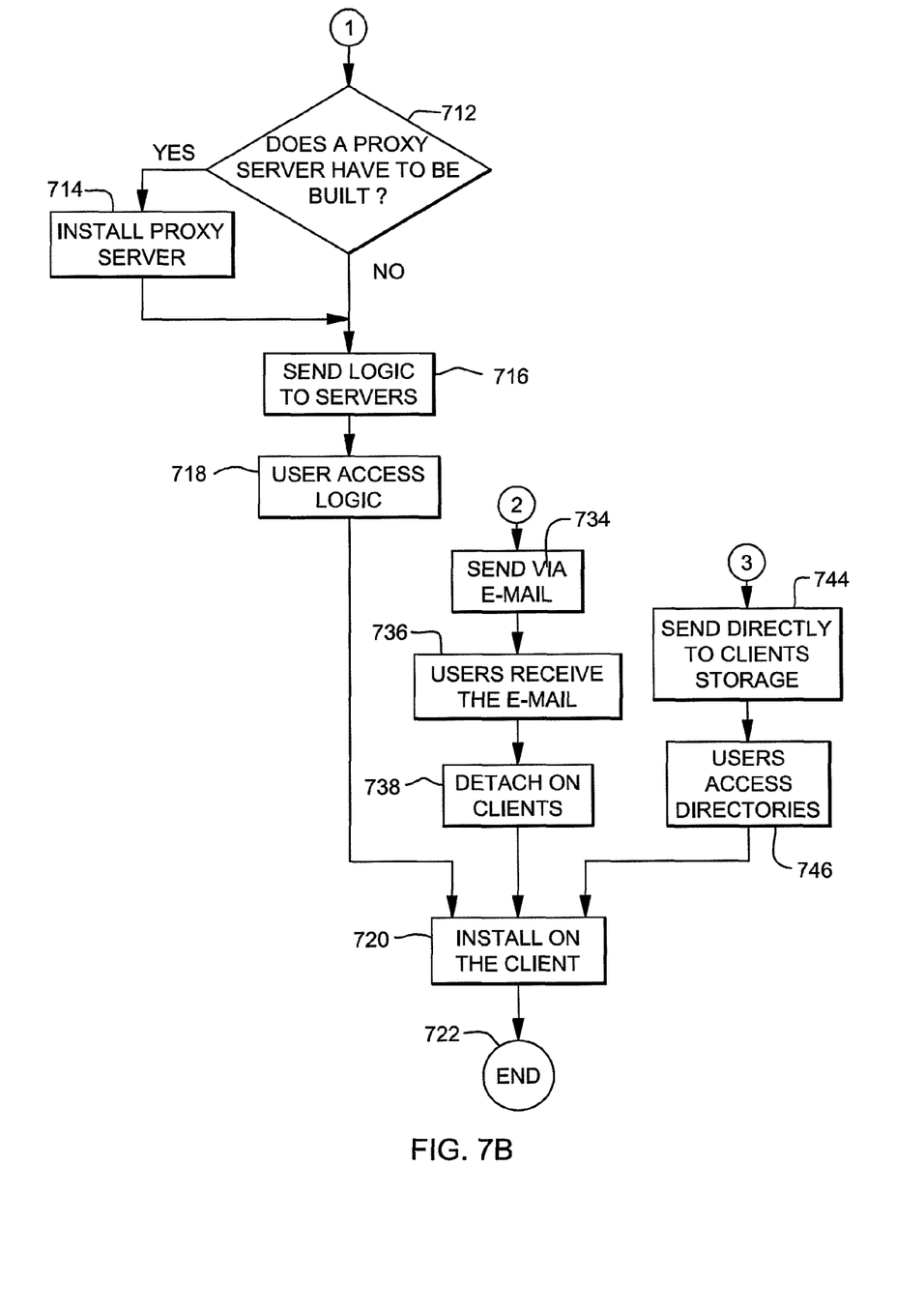

Thereafter, or if there are no executables, a further determination is made as to whether the provisioning logic is to be deployed by having users access the logic on a server or servers, INQUIRY 708. If the users are to access the provisioning logic on servers, then the server addresses that are to store the logic are identified, STEP 710. In one example, a determination is made as to whether a proxy server is to be built to store the provisioning logic, INQUIRY 712 (FIG. 7B). A proxy server is the server that sits between a client application, such as a web browser, and a real server. It intercepts the requests to the real server to see if it can fulfill the request itself. If not, it forwards the request to the real server. Two primary benefits of the proxy server are to improve performance and to filter requests. If a proxy server is to be built, then the proxy server is installed, STEP 714.

Thereafter, or if a proxy server is not to be built, the provisioning logic is sent to the server either via a protocol, such as file transfer protocol (FTP), or it is copied directly from the source files to the server files via file sharing, STEP 716. As another example, a transaction is sent to the one or more servers that includes the provisioning logic and the servers process the transaction, then receive and copy the logic to the servers' file systems.

After the provisioning logic is stored at the servers, the users, via their client computers, access the logic on the servers and may copy at least a portion of the logic to their client computers' file systems, STEP 718. The user then executes the program that installs the logic on the client computer, STEP 720. In a further example, the servers automatically copy one or more aspects of the provisioning logic to each client and then run the installation program for the logic at each client computer. This concludes one example of the deployment processing, STEP 722.

Returning to INQUIRY 708 (FIG. 7A), if the logic is not to be deployed by having users access the logic on one or more servers, then processing continues with a determination as to whether the logic is to be deployed by sending the logic to users via e-mail, INQUIRY 730. If so, the set of users where the logic is to be deployed is identified together with the addresses of the user client computers, STEP 732. The authentication logic is sent via e-mail to each of the user's client computers, STEP 734 (FIG. 7B). The users receive the e-mail, STEP 736, and detach the provisioning logic from the e-mail to a directory on their client computers, STEP 738. The user executes the program that installs the logic on the client computer, STEP 720, and exits the process, STEP 722.

Returning to INQUIRY 730 (FIG. 7A), if the provisioning logic is not to be deployed via e-mail, then a further determination is made as to whether the logic is to be sent directly to user directories on their client computers, STEP 740. If so, the user directories are identified, STEP 742. The provisioning logic is directly transferred to the user's client computer directory, STEP 744 (FIG. 7B). This can be done in several ways, such as, but not limited to, sharing of the file system directories and then copying from the sender's file system to the recipient user's file system, or alternatively, using a transfer protocol, such as file transfer protocol (FTP). The users access the directories on their client file systems in preparation for installing the provisioning logic, STEP 746. The user executes the program that installs the logic on the client computer, STEP 720, and exits the deployment process, STEP 722.

Returning to INQUIRY 740 (FIG. 7A), if the logic is not to be sent directly to the users' directories, then processing ends, STEP 750.

Although an embodiment of deploying logic is provided, many variations can be made without departing from the spirit of the present invention.

One or more aspects of the present invention can be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider can receive payment from the customer under a subscription and/or fee agreement, as examples. Additionally or alternatively, the service provider can receive payment from the sale of advertising content to one or more third parties.

In one aspect of the present invention, an application can be deployed for performing one or more aspects of the present invention, as described above. As one example, the deploying of an application comprises providing computer infrastructure operable to perform one or more aspects of the present invention.

As a further aspect of the present invention, a computing infrastructure can be deployed comprising integrating computer readable code into a computing system, in which the code in combination with the computing system is capable of performing one or more aspects of the present invention.

As yet a further aspect of the present invention, a process for integrating computing infrastructure, comprising integrating computer readable code into a computer system may be provided. The computer system comprises a computer usable medium, in which the computer usable medium comprises one or more aspects of the present invention. The code in combination with the computer system is capable of performing one or more aspects of the present invention.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 8:
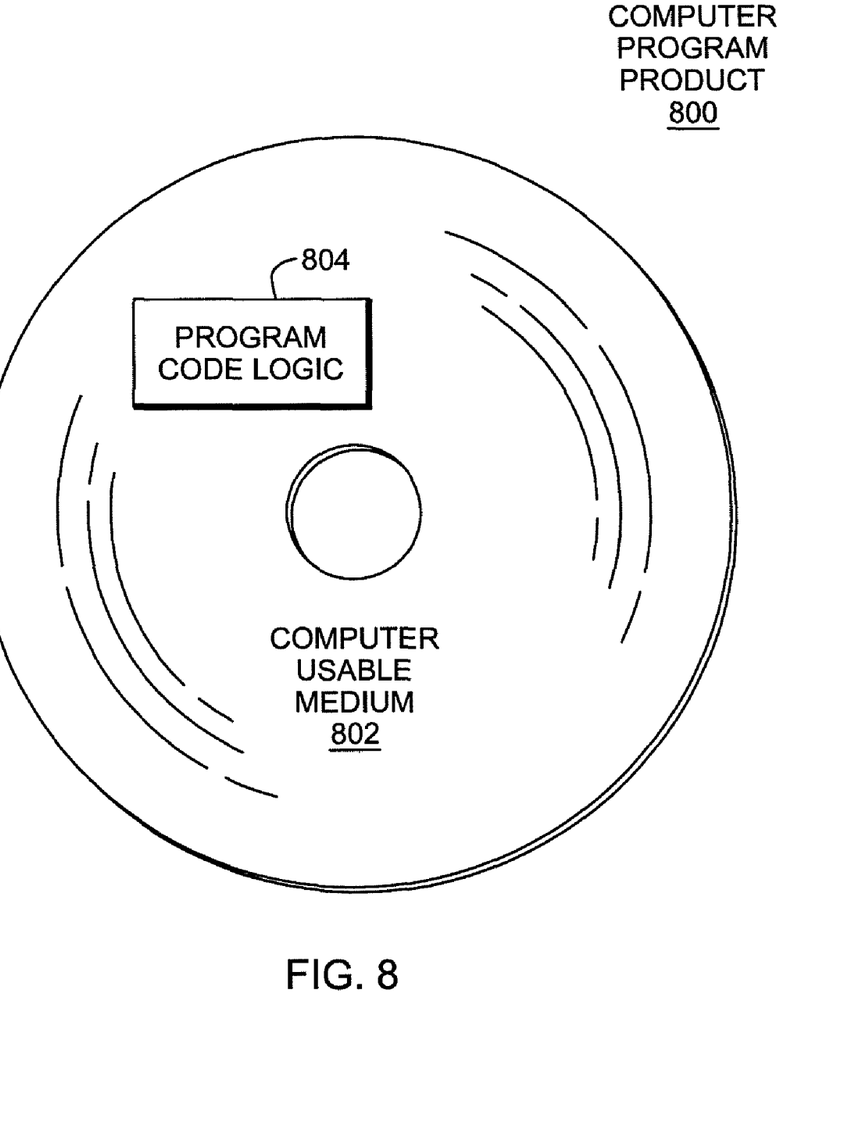
FIG. 8 depicts one embodiment of a computer program product incorporating one or more aspects of the present invention.

One example of an article of manufacture or a computer program product incorporating one or more aspects of the present invention is described with reference to FIG. 8. A computer program product 800 includes, for instance, one or more computer usable media 802 to store computer readable program code means or logic 804 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, an automatic provisioning capability is provided that allows for the rapid provisioning of resources, such as nodes, in a High Performance Computing (HPC) or grid environment that requires the addition of new servers or the reconfiguration of existing servers. The capability allows the tasks to be managed, such that the risk of network bottlenecks resulting from large scale concurrent build requests for target nodes is eliminated. Further, the capability enables the simultaneous provisioning of large numbers of nodes (e.g., hundreds) without necessarily bringing down the network.

Moreover, by tearing down temporary build servers (i.e., child build servers) and rebuilding them into standard compute nodes, as part of the provisioning capability, enables maximum operational efficiency. This technique enables a minimum infrastructure configuration for management build nodes within a data center and maximizes the number of compute nodes available for productive use. The efficiencies created within this technique enable large scale bare metal node builds to be executed in the shortest possible mean time to deploy (MTTD). It allows data centers to allocate servers at a peak level and achieve the highest utilization by dynamically re-purposing transient management infrastructure into productive compute nodes at deployment time.

Advantageously, relevant imaging and server build content is relocated to a nearest neighbor resource, ideally within the same broadcast domain as targets, thereby eliminating layer 3 bottlenecks and increasing deployment efficiency. For instance, a child head node in a subnet locally builds compute nodes. This is to address potential layer 3 (L3) networking bottlenecks which can occur during large scale deployments given the sheer amount of traffic these deployments generate. By creating an intermediary child head node and leveraging it to launch the local deployments, the child head node builds all required nodes within its local subnet, thereby enabling large scale deployments across multiple subnets. The result enables many parallel build processes to run simultaneously without impacting the overall network efficiency.

One or more aspects of the present invention have application to high performance environments which need to rapidly build or rebuild data center resources. It has application in any environment which implements shared infrastructure and requires significant reconfiguration to occur regularly, such as test and development labs, compute hosting centers and IT learning centers, as examples.

Rapid, repeatable and error free deployment is provided for each build server, resulting in customer satisfaction. In one example, it has been shown that one build server can have 1000 nodes built in 2 hours.

Although various embodiments are described above, these are only examples. Different types of nodes or the number of nodes being provisioned can be different than described herein. Further, the building of nodes can use different provisioning tools or no tools at all; it can include loading other types of applications or information. The configuration files can also include different information depending on implementation.

Moreover, other types of computing environments can benefit from one or more aspects of the present invention. For example, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

As used herein, the term obtaining, such as in obtaining a request, includes, but is not limited to, receiving, being provided, retrieving, determining, accessing, etc.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of building a specified number of computing nodes to be provisioned, wherein the building requires installation in the computing nodes of software downloaded via a network, the method comprising:
   a computer system receiving a request to build the specified number of the computing nodes for provisioning, and in response, the computer system determining that download of the software for concurrently building the specified number of computing nodes will exceed bandwidth capability of the network, and in response, the computer system determining and invoking a plurality of computers to concurrently build some but less than all of the specified number of computing nodes to avoid exceeding bandwidth capability of the network; and
   while building the some but less than all of the specified number of computing nodes, the computer system recognizing sufficient available bandwidth in the network to concurrently build an additional one or more of the specified number of computing nodes, and in response, the computer system determining and invoking one or more additional computers to build the one or more of the specified number of computing nodes, while at least one of the plurality of computers builds at least one of the some but less than all of the specified number of computing nodes.

2. The method of claim 1, wherein the computer system comprises a management builder, the management builder comprising one node of a grid computing environment, and the plurality of computers comprising a plurality of nodes of the grid computing environment different from the one node, and wherein the number of computing nodes comprises a number of nodes of the grid computing environment, the number of nodes excluding the one node, and optionally including the plurality of nodes.

3. The method of claim 1, further comprising building the plurality of computers, wherein each computer of the plurality of computers is responsible for building a respective number of the computing nodes.

4. The method of claim 3, wherein the invoking one or more additional computers comprises initiating the one or more additional computers, in response to an indication that a computer has completed building its respective number of computing nodes.

5. The method of claim 4, further comprising transforming the computer that has completed its building to a non-builder resource capable of functioning as a computing node.

6. The method of claim 5, wherein the transforming comprises:
rebooting the computer; and
rebuilding the computer with a customer's image.

7. The method of claim 1, wherein a number of computers to be invoked is specified in a variable obtained by the computer system.

8. The method of claim 1, wherein the request includes an indication of the type of computing nodes requested and information regarding the customer for which the computing nodes are to be provisioned.

9. A computer system for building a specified number of computing nodes to be provisioned, wherein the building requires installation in the computing nodes of software downloaded via a network, the computer system comprising:
a central processing unit, a computer readable memory and one or more computer readable storage devices;
first program instructions to receive a request to build the specified number of the computing nodes for provisioning;
second program instructions responsive to the request to determine that download of the software for concurrently building the specified number of computing nodes will exceed bandwidth capability of the network, and in response, to determine and invoke a plurality of computers to concurrently build some but less than all of the specified number of computing nodes to avoid exceeding bandwidth capability of the network, and while building the some but less than all of the specified number of computing nodes, to recognize sufficient available bandwidth in the network to concurrently builds an additional one or more of the specified number of computing nodes, and in response, to determine and invoke one or more additional computers to build the one or more of the specified number of computing nodes, while at least one of the plurality of computers builds at least one of the some but less than all of the specified number of computing nodes; and wherein
the first and second program instructions are stored on the one or more computer readable storage devices for execution by the central processing unit via the computer readable memory.

10. The computer system of claim 9, wherein each computer of the plurality of computers is responsible for building a respective number of the portion of computing nodes.

11. The computer system of claim 10, wherein the invoking one or more additional computers comprises initiating the one or more additional computers, in response to an indication that a computer has completed building its respective number of computing nodes.

12. The computer system of claim 11, further comprising third program instructions stored on the one or more computer readable storage devices to transform the computer that has completed its building to a non-builder resource capable of functioning as a computing node.

13. The computer system of claim 9, wherein a number of computers to be invoked is specified in a variable.

14. A computer program product comprising:
at least one computer readable storage device and computer readable program code stored thereon to build a specified number of computing nodes to be provisioned, wherein the building requires installation in the computing nodes of software downloaded via a network, said computer readable program code when executing performing the following:
receiving a request to build the specified number of the computing nodes for provisioning, and in response, determining that download of the software for concurrently building the specified number of computing nodes will exceed bandwidth capability of the network, and in response, determining and invoking a plurality of computers to concurrently build some but less than all of the specified number of computing nodes to avoid exceeding bandwidth capability of the network; and
while building the some but less than all of the specified number of computing nodes, recognizing sufficient available bandwidth in the network to concurrently build an additional one or more of the specified number of computing nodes, and in response, determining and invoking one or more additional computers to build the one or more of the specified number of computing nodes, while at least one of the plurality of computers builds at least one of the some but less than all of the specified number of computing nodes.

15. The computer program product of claim 14, further comprising building the plurality of computers, wherein each computer of the plurality of computers is responsible for building a respective number of computing nodes.

16. The computer program product of claim 15, wherein the invoking one or more additional computers comprises initiating the one or more additional computers, in response to an indication that a computer has completed building its respective number of computing nodes.

17. The computer program product of claim 16, further comprising transforming the computer that has completed its building to a non-builder resource capable of functioning as a computing node.

18. The computer program product of claim 14, wherein the number of computers to be invoked is specified in a variable.

19. The computer program product of claim 14, wherein the request includes an indication of the type of computing nodes requested and information regarding the customer for which the computing nodes are to be provisioned.

* * * * *